Patented Oct. 23, 1934

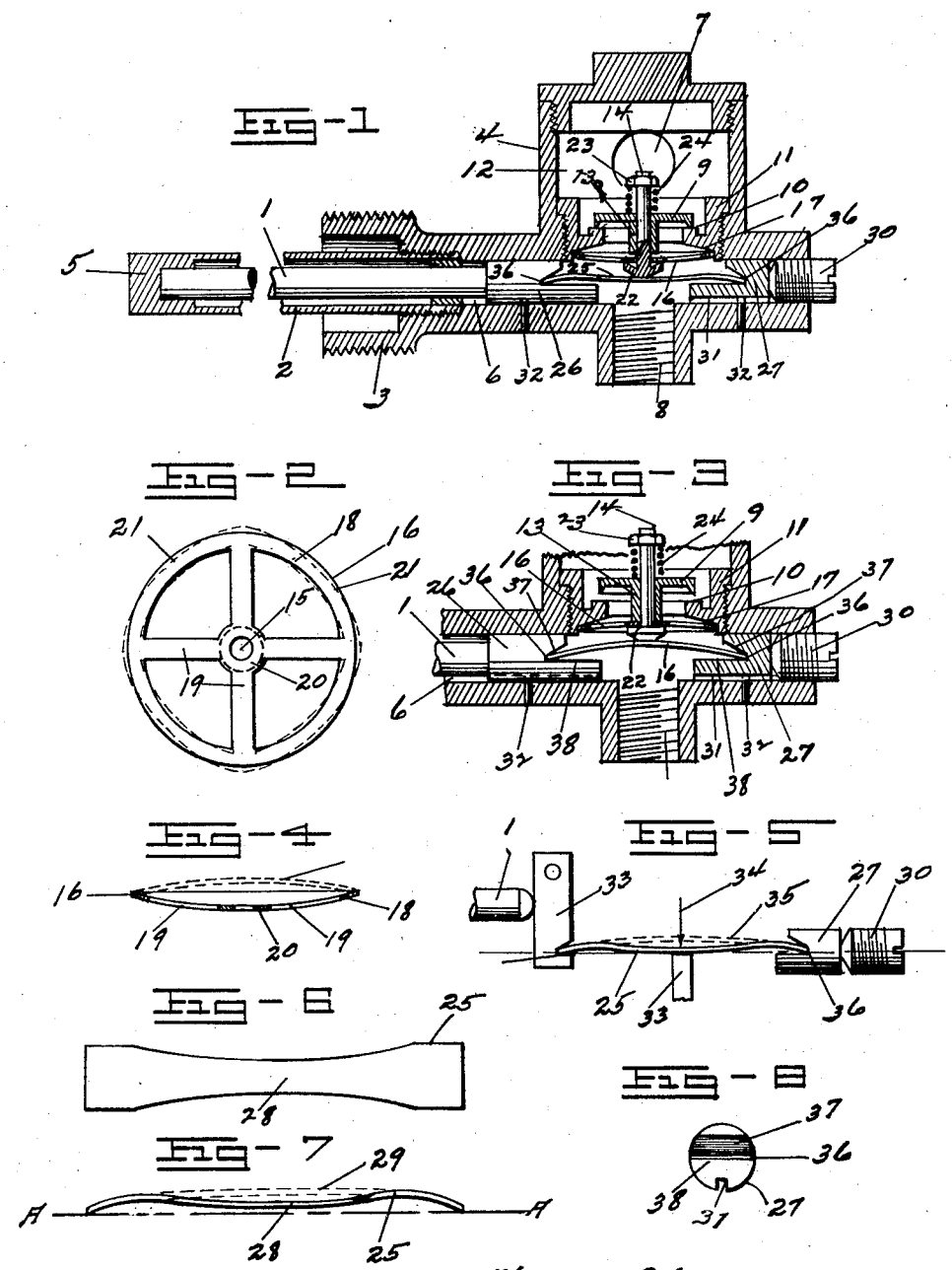

1,977,656

UNITED STATES PATENT OFFICE 1,977,656

THERMOSTATIC VALVE

Sidney P. Vaughn, United States Navy, Ackerman, Miss.

Application November 4, 1932, Serial No. 641,191

12 Claims. (Cl. 236—48)

(Granted under the act of March 3, 1883, as amended April 30, 1928; 370 O. G. 757)

I agree that the invention may be manufactured and used by or for the Government for governmental purposes without the payment to me of any royalty thereon.

This invention relates to snap action thermostats generally, but has particular reference to those adapted to the requirements of gas heated water heaters, ovens and similar types of gas heated devices.

The principal object of my invention is to provide a snap action thermostatic valve, or electric switch, of simple, compact, durable and economic construction which is extremely sensitive to temperature changes and positive in action.

Another object is to provide a snap action thermostatic valve wherein the valve is carried by and normally held seated by a snap action overcenter spring, and which is opened with a snap action when the overcenter spring is snapped into a reverse form by a thermally responsive element.

Another object is to provide a simple but positive means to hold the valve tight on its seat up to the point when the overcenter spring snaps into a reverse form to open the valve.

Another object is to provide a simple, positive and sensitive means for actuating the overcenter spring and causing it to snap into a reverse form.

Another object is to provide a simple but improved type of adjustment for temperature regulation.

A further object is to provide a simple but durable type of overcenter spring which will stand strains greater than the disk type of overcenter spring.

These and other objects are obtained by means of the embodiment of my invention illustrated in the accompanying drawing in which:

Fig. 1 is a longitudinal section through a thermostatically controlled gas valve for a water heater embodying my invention and showing the position of the parts when the valve is closed.

Fig. 2 is a plan view of a dished overcenter spring used for supporting the valve and actuating it to an opened or closed position.

Fig. 3 is a sectional view of Fig. 1 showing the position of the parts after the valve has been snapped open.

Fig. 4 is a sectional view of Fig. 2.

Fig. 5 is a view of a modified form of construction of certain parts and showing how the movement of the thermostatic element may be amplified.

Fig. 6 is a plan view of a leaf spring element utilized to actuate the overcenter spring and valve.

Fig. 7 is an elevation of Fig. 6 and shows the normal form of the leaf spring element.

Fig. 8 is an end view of one of the abutment members used to hold and exert an end thrust on the ends of the spring element illustrated in Fig. 7.

Like numerals refer to like parts throughout the several views.

In other thermostats of this type in which a snap action overcenter spring, such as a snap disk, is used to actuate the valve to an open or closed position, the overcenter spring is generally fixed in or supported in the valve body and actuated by an amplification lever moved by a thermally expansible element. In such valves the valve itself is normally held seated by a spring acting between the valve body and the valve, against which the overcenter spring or snap disk must work in order to snap open the valve. One important feature of this invention is to have the overcenter spring support the valve on its normally convex side in such a manner that the overcenter spring will perform the function of holding the valve tightly on its seat when in a normally closed position. With this form of construction it is possible to obtain a very sensitive thermostat. Another important feature is the elimination of the usual amplification levers, except where an extremely sensitive thermostat is desired, by utilizing end thrust on a leaf spring element of such a form that when it bows in the middle, it will exert a resilient force on the convex side of the overcenter spring and cause it to snap into a reverse form. The general form of the leaf spring element is illustrated in Fig. 7 of my pending application Ser. No. 512,603, filed 31 Jan. 1931, but is more fully described herein.

The thermostatic valve illustrated in the accompanying drawing embodies my invention and comprises the usual thermostatic elements 1 and 2. The element 1 is preferably a rod of invar or other metal having a low coefficient of expansion and the element 2 is preferably a copper or aluminum tube or a tube made of other metal having a high coefficient of expansion. The tube 2 is screwed tight in an externally threaded plug 3 of a hollow valve body 4. The outer end of the invar rod 1 presses tightly against a closed outer end 5 of the tube 2, and the inner end extends into a bore 6 passing through the valve body 4 at right angles to the vertical axis of the bore 12 of the hollow body. By virtue of this connection it is evident that expansion and contraction of the tube 2 results in slight endwise movement of the rod 1.

The plug 3 is externally threaded to screw watertight into the wall of a gas heated water tank. The hollow valve body 4 has an inlet 7 which is connected to the gas supply and an outlet 8 which is connected to the burner used to heat the tank.

The flow of gas from the inlet 7 to the outlet 8 is controlled by a mushroom type of valve 9 shiftable onto and off its seat 10 provided in a ring member 11 screwed in the vertical bore 12 of the valve body and forming a partition between the inlet side and the outlet side. The valve has a hollow valve stem 13 slidably mounted on a pin 14 supported by, and extending through the center opening 15 of a circular overcenter snap spring 16 supported at its edge on a tapered annular shoulder 17 formed in the outlet wall of the ring member 11. The circular overcenter snap spring 16 comprises a resilient ring 18 connected by two or more bowed radial members 19 to a hub member 20 having a central opening 15 through which the valve stem pin 14 passes. I prefer to stamp the overcenter spring 16 out of a single piece of spring metal and to give it a normally concavo-convex or dished form as illustrated in Fig. 4, and of such concavity that it will have the property of regaining its normally convexo-concave form after it is snapped into a reverse or concavo-convex form. This form of overcenter spring should not be confused with the snap disk type of overcenter spring, although the action appears to be similar. Where a solid dished disk is made to snap into a reverse form all of the metal in the disk is stressed or buckled without increasing the diameter of the disk, whereas in the form of overcenter spring described herein, that part of the resilient ring 18 between the radial members 19, tends to straighten out as illustrated by the dotted lines 21 which permits the radial members 19 to attain a reverse form without buckling. In other words, the radial members 19, in attaining a reverse form, tend to increase in length instead of buckling, and the stresses set up in the metal when snapped into a reverse form are sufficient to cause the overcenter spring to regain its normal form when the pressure exerted to snap it is removed. This form of overcenter spring has many advantages over the disk type of overcenter spring. The spring metal used may be much thicker than is possible to use in a snap disk and the possibilities of the overcenter spring becoming permanently distorted when abnormal pressures are exerted are reduced to a minimum.

The lower end of the pin 14 is provided with a cupped head 22, the edge of which presses against the convex side of the overcenter spring 16. The upper end of the pin 14 has an adjustable nut 23 threaded thereon. Between the nut 23 and the valve member 9 a compression spring 24 is provided to press the valve member 9 toward its seat 10, the function of which will be more fully explained hereinafter. In a normally closed position the lower end of the hollow valve stem 13 is slightly spaced from the normally concave side of the overcenter spring 16. With the construction illustrated and described it is apparent that in a normally closed position the valve is held tightly on its seat by the action of the overcenter spring tending to maintain its normal concavo-convex form. When sufficient upward pressure is applied to the head 22 of the pin 14 the overcenter spring 16 will snap into a reverse form, permitting the pin 14 to rise. The valve will be held seated by the action of the compression spring 24 until the overcenter spring 16 makes contact with the lower end of the hollow valve stem 13, at which time the valve 9 will be opened with a snap action. The small amount of play between the normally concave side of the overcenter spring 16 and the valve stem 13 is necessary to keep the valve seated until the center of the overcenter spring has been moved far enough to cause it to snap into a reverse form. The amount of pressure necessary to snap the overcenter spring into a reverse form is regulated by the adjustable nut 23, which when screwed down increases the pressure on the valve and pulls the head of the pin against the convex side of the overcenter spring, tending to flatten the overcenter spring, or in other words reducing its concavity. It is well known that the deeper the concavity of such an overcenter spring the greater the pressure necessary to snap it into a reverse form.

Any inward movement of the thermostatic rod 1 is transmitted to the valve assembly through the intermediary of a leaf spring 25 supported at right angles to the axis of the valve stem between abutment members 26 and 27 slidably mounted in the bore 6 into which the inner end of the thermostatic rod 1 extends. The middle part 28 of the leaf spring 25 is normally concavo-convex lengthwise, with the ends of the spring bent downward in an opposite curvature, as illustrated in Fig. 7, in such a manner that if the spring were placed on a line A—A the middle of the spring would lie in a plane above the ends of the spring. Its form is such that if a pressure be applied to each end its normally concavo-convex form would be changed to a convexo-concave or reverse form as illustrated by the dotted lines 29 in Fig. 7. A certain amount of resiliency is given to the leaf spring by tapering its plan form so that the ends will be wider than the middle as illustrated in Fig. 6. Resiliency is also attained by having the ends of the spring bent downward as illustrated in Fig. 7. This resiliency of the leaf spring is essential to the successful operation of the valve, as will be more fully described. The leaf spring is so supported between the abutment members 26 and 27 that the normally concave side of the leaf spring 25 just makes contact with the head 22 of the pin 14 carrying the valve as illustrated in Fig. 1. The abutment member 26 makes contact with the end of the thermostatic rod 1 and the abutment member 27 makes contact with an adjustment screw 30 provided to increase or decrease the pressure on the ends of the leaf spring 25 and to adjust the thermostat to respond to predetermined variations.

In operation assume that the adjustment screw 30 is set to cause the valve to snap open at a predetermined temperature. When the temperature of the fluid in which the thermostatic tube 2 is immersed drops to that for which the thermostat is adjusted the end of the thermostatic rod makes contact with the abutment member 26 and exerts a pressure thereon. This pressure is transmitted to the end of the leaf spring, and causes it to buckle upward and press tightly against the head 22 of the pin 14. The upward movement of the head of the pin is resisted by the overcenter spring 16 until the upward pressure exerted by the buckling of the leaf spring 25 is sufficient to overcome the resistance of the overcenter spring 16. As the pressure exerted by the abutment members on the ends of the leaf spring increases, the leaf spring will first bend slightly upward near its ends, which will increase the upward pressure exerted by the middle portion of the leaf spring on the head of the pin. When the upward pressure acting on the head of the pin is sufficient, the overcenter spring will snap suddenly into a reverse form and open the valve with a snap action as illustrated in Fig. 3. When the pressure is released both the overcenter spring and the leaf spring will regain their normal form with a snap action, permitting the valve to close suddenly. Now if the leaf spring 25 were a straight spring and it were bowed upwardly at its middle to open the valve, the leaf spring would be exerting a stiff pressure instead of a resilient pressure against the valve and cause the valve to open and close with a slow movement. It is therefore very essential that the ends of the leaf spring be bent downward as illustrated to provide the necessary resiliency and to cause it to bend upward instead of downward.

The abutment members 26 and 27 have a longitudinal slot 31 provided to receive pins 32 extending into the bore 6 to prevent the abutment members turning when the adjustment screw 30 is turned.

For most purposes the movement of and the direct pressure exerted by the thermostatic rod through the abutment member 26 on the end of the leaf spring will be sufficient to actuate the valve with a slight temperature variation of about 15 degrees. It may be desirable however, to provide a thermostat that is more sensitive to temperature variations, in which case the movement of the thermostatic rod must be amplified. To amplify this movement I provide in the place of the abutment member 26 a stiff amplification lever 33', illustrated in Fig. 5, pivoted at its upper end to the valve body and slotted at its lower end to receive the end of the leaf spring 25, and so positioned that the thermostatic rod 1 exerts a pressure on the back thereof toward the leaf spring.

The form of leaf spring illustrated herein is readily converted into a snap spring by providing a support 33 for the middle of the leaf spring to prevent it bending downward, and by exerting a resilient downward pressure as indicated by the arrow 34 as illustrated in Fig. 5. The resilient downward pressure may be that exerted by a valve or electrical contact pressed downward by the spring. When pressure is applied to the ends of the leaf spring 25 the tendency is to bend downward due to the resilient pressure indicated by the arrow, but since this downward bending is resisted by the support 33 the leaf spring will buckle at both ends in an upward direction, which buckle will travel in a wave motion toward the middle of the leaf spring. When the movement is sufficient to cause an upward pressure on the middle of the leaf spring greater than the resilient downward pressure exerted thereon, the leaf spring will snap suddenly into a reverse form as indicated by the dotted lines 35. When the upward pressure acting against the resilient downward pressure is removed the leaf spring will regain its normal form with a snap action. This type of snap spring is readily adaptable for operating switches and valves with a snap action, and may be used alone or in combination with the overcenter snap spring illustrated in Fig. 2. It has many advantages in that the valve or switch is held firmly seated until the leaf spring snaps into a reverse form.

Fig. 8 illustrates an end view of the abutment members 26 and 27. The slot 36 provided to receive the ends of the leaf spring has an upper wall 37 inclined upwardly in the direction of the bow of the leaf spring and a lower wall 38 parallel with the longitudinal axis of the leaf spring. The lower wall extends some distance toward the middle of the leaf spring, as illustrated in Fig. 1, to prevent the leaf spring from being bent downward.

It is believed that the foregoing description conveys a clear understanding of the objects and advantages of my invention. While I have illustrated and described the application thereof in the case of gas operated water heaters, it will be understood that various changes and modifications may be made therein without departing from the spirit of the invention and the spirit and scope of the appended claims.

I claim:

1. In a thermostatic device of the character described, the combination with a thermostatic element arranged to move according to temperature variation, of an element arranged to be operated, a leaf spring supported by its ends between abutment members and arranged to actuate the element when bowed or flexed, and an overcenter spring element arranged to cause said element to move with a snap action, said thermostatic element being arranged to exert an end thrust on said leaf spring to actuate the element.

2. A device as set forth in claim 1 and including means to advance or delay the end thrust exerted on said leaf spring by the thermostatic element.

3. A device as set forth in claim 1 wherein the leaf spring has one or both of its ends bent below the normal plane of the leaf spring to cause the leaf spring to bow or flex upward or away from the bent ends when an end pressure is applied thereto.

4. A device as set forth in claim 1 wherein the middle portion of the leaf spring is normally slightly bowed or curved longitudinally and the ends of the leaf spring are bent in an opposite direction.

5. A device as set forth in claim 1 wherein the overcenter spring supports the element and has the property of regaining its normal form when the pressure snapping it into a reverse form is removed.

6. A device as set forth in claim 1 and including means to amplify the movement of the thermostatic element and to transmit the amplified movement to one end of the leaf spring to exert a thrust thereon.

7. In a thermostatic device of the character described, the combination with a thermostatic element arranged to move according to temperature variations, of a valve or other element arranged to be operated, a leaf spring supported by its ends between two abutment members and arranged to actuate said valve or other element when bowed or flexed, and an overcenter spring element arranged to cause said valve or other element to move with a snap action said thermostatic element being arranged to exert an end thrust on said leaf spring to actuate said valve or other element.

8. In a valve device adapted to open and close with a snap action, a ring member including an annular valve seat, an annular shoulder formed in the side opposite to said valve seat, a normally concavo-convex overcenter circular spring resting on said shoulder with the normally concave side toward the shoulder, a pin passing through the center of said overcenter spring and having a head pressing against the normally convex side of the overcenter spring, a valve member slidably mounted on said pin on the valve seat side of said ring member and having a valve stem the end of which is slightly spaced from the normally concave side of the overcenter spring, an adjustable nut on said pin, and a spring acting between said nut and said valve member to keep the valve seated until it is unseated by the action of the overcenter spring making contact with the valve stem when the overcenter spring is snapped into a reverse form.

9. In a device as set forth in claim 8, and including thermostatic means to actuate said valve.

10. In a thermostatic device of the character described, the combination with a thermostatic element arranged to move according to temperature variation, of a valve arranged to be operated, abutment members, a leaf spring supported by its ends between said abutment members and arranged to actuate said valve when bowed or flexed, and an overcenter spring arranged to cause said valve to move with snap action, said thermostatic element being arranged to exert an end thrust on one of said abutment members whereby said abutment members will exert an end thrust on said leaf spring to actuate said valve.

11. In a thermostatic device of the character described, the combination with a thermostatic element arranged to move according to temperature variation, of an element arranged to be operated, abutment members, a leaf spring supported by its ends between said abutment members and arranged to actuate said element when bowed or flexed, an overcenter spring arranged to cause said element to move with snap action, said thermostatic element being arranged to exert an end thrust on one of said abutment members whereby said abutment members will exert an end thrust on said leaf spring to actuate said element, and means for adjustably securing the other of said abutment members.

12. In a thermostatic device of the character described, the combination with a thermostatic element arranged to move according to temperature variation, of an element arranged to be operated, abutment members, a leaf spring supported by its ends between said abutment members and arranged to actuate said element when bowed or flexed, an overcenter spring arranged to cause said element to move with snap action, said thermostatic element being arranged to exert an end thrust on one of said abutment members whereby said abutment members will exert an end thrust on said leaf spring to actuate said element, means for adjustably securing the other of said abutment members, and means mounting said abutment members permitting endwise movement thereof but preventing rotative movement thereof.

SIDNEY P. VAUGHN.